(12) United States Patent
Watanabe et al.

(10) Patent No.: US 12,096,073 B2
(45) Date of Patent: Sep. 17, 2024

(54) INFORMATION PROCESSING DEVICE, INFORMATION PROCESSING METHOD, AND RECORDING/REPRODUCTION SYSTEM

(71) Applicant: SONY GROUP CORPORATION, Tokyo (JP)

(72) Inventors: Takahiro Watanabe, Tokyo (JP); Shuichiro Nishigori, Tokyo (JP); Hirofumi Takeda, Tokyo (JP); Shiro Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 46 days.

(21) Appl. No.: 18/001,921

(22) PCT Filed: Apr. 30, 2021

(86) PCT No.: PCT/JP2021/017285
§ 371 (c)(1),
(2) Date: Dec. 15, 2022

(87) PCT Pub. No.: WO2021/261085
PCT Pub. Date: Dec. 30, 2021

(65) Prior Publication Data
US 2023/0254535 A1    Aug. 10, 2023

(30) Foreign Application Priority Data

Jun. 26, 2020   (JP) ................................. 2020-110393

(51) Int. Cl.
*H04N 21/442*    (2011.01)
*H04N 21/422*    (2011.01)

(52) U.S. Cl.
CPC . *H04N 21/44218* (2013.01); *H04N 21/42202* (2013.01)

(58) Field of Classification Search
None
See application file for complete search history.

(56) References Cited

U.S. PATENT DOCUMENTS

2020/0154229 A1    5/2020    Habets et al.

FOREIGN PATENT DOCUMENTS

| JP | 2013-033104 A | 2/2013 |
| WO | 2019/013056 A1 | 1/2019 |

OTHER PUBLICATIONS

International Search Report and Written Opinion of PCT Application No. PCT/JP2021/017285, issued on Aug. 10, 2021, 09 pages of ISRWO.

*Primary Examiner* — Anthony Bantamoi
(74) *Attorney, Agent, or Firm* — CHIP LAW GROUP

(57) ABSTRACT

To reduce uncomfortableness in the transmission of sensory stimulation information, the uncomfortableness being caused by different recording and reproducing environments. An information processing device according to the present technique includes: a positional-relationship-information acquisition unit that acquires information on a first positional relationship between a recording device and a recording subject, the recording device performing recording in a recording environment for recording sensory stimulation information transmitted from the recording subject, and information on a second positional relationship between the recording subject and a user in the reproduction environment of the recorded sensory stimulation information; and a correction unit that corrects the output signals of reproducing devices for the reproduction of the sensory stimulation information on the basis of the information on the first positional relationship and the information on the second positional relationship.

17 Claims, 9 Drawing Sheets

TABLE 1: ARRIVAL TIME OF SENSORY STIMULATION INFORMATION

| ARRIVAL TIME | T0 | | | | | (t) |
|---|---|---|---|---|---|---|
| VIDEO | Tr (≒Ta, Tb) | | | | | |
| SOUND | | | | Tr | Ta | Tb |
| VIBRATION | | Tr | Ta | Tb | | |

Fig. 5

TABLE 1: TRANSMISSION RATE

| TIME | SOUND: AIR [m/s] | VIBRATION: IRON/WOOD [m/s] |
|---|---|---|
| TRANSMISSION RATE | 343 | 5000 |

TABLE 2: TRANSMISSION DISTANCE

| TIME | SOUND: AIR [m] | VIBRATION: IRON/WOOD [m] |
|---|---|---|
| 1ms | 0.343 | 5 |
| 10ms | 3.43 | 50 |
| 100ms | 34.3 | 500 |

TABLE 3: ARRIVAL TIME

| DISTANCE | SOUND: AIR [s] | VIBRATION: IRON/WOOD [s] |
|---|---|---|
| 1m | 2.92 | 0.20 |
| 2m | 5.83 | 0.40 |
| 3m | 8.75 | 0.60 |
| 4m | 11.66 | 0.80 |
| 5m | 14.58 | 1.00 |

INFORMATION PROCESSING DEVICE, INFORMATION PROCESSING METHOD, AND RECORDING/REPRODUCTION SYSTEM

CROSS REFERENCE TO RELATED APPLICATIONS

This application is a U.S. National Phase of International Patent Application No. PCT/JP2021/017285 filed on Apr. 30, 2021, which claims priority benefit of Japanese Patent Application No. JP 2020-110393 filed in the Japan Patent Office on Jun. 26, 2020. Each of the above-referenced applications is hereby incorporated herein by reference in its entirety.

TECHNICAL FIELD

The present technique relates to an information processing device, an information processing method, a program, and a recording/reproduction system.

BACKGROUND ART

Conventionally, various techniques for presenting recorded information about sensory stimuli including a tactile stimulus to a user are proposed as described in, for example, PTL 1.

CITATION LIST

Patent Literature

[PTL 1]
WO 2019/013056

SUMMARY

Technical Problem

In recorded contents such as sports and movies, sensory stimulation information includes videos, sounds, and vibrations and is reproduced by a reproducing unit, so that a user can enjoy the contents even if the user is located at a site different from a recording site.

However, such sensory stimulation information is conveyed in various manners with different transmission rates or damping factors depending upon the environment. Thus, if the contents are recorded and reproduced in different environments, sound and vibrations of video may propagate in a different manner from the recognition of a user, so that the user of the contents may feel uncomfortable and the realism of the contents may be lost.

The present technique has been devised in view of the circumstances. An object of the present technique is to reduce uncomfortableness in the transmission of sensory stimulation information, the uncomfortableness being caused by different recording and reproducing environments.

Solution to Problem

An information processing device according to the present technique is an information processing device including: a positional-relationship-information acquisition unit that acquires information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information, and a correction unit that corrects the output signals of reproducing devices for the reproduction of the sensory stimulation information on the basis of the information on the first positional relationship and the information on the second positional relationship.

The sensory stimulation information is various kinds of stimulation information about, for example, videos, sounds, sensory stimuli, and odors that are perceivable by the user.

The recording subject is assumed to be, for example, an object that serves as a vibration source or a sound source in the recording environment. The recording device is, for example, an imaging device for imaging, a microphone for collecting acoustic information, and an IMU (Inertial Measurement Unit) for collecting vibration information.

The position of the recording subject in the reproduction environment is position information in which an object is supposed to be recognized by the user having received the sensory stimulation information. For example, to the user who watches a display part (e.g., a screen or a display) showing a video of a basketball as a recording subject, the position of the recording subject is the position of the basketball virtually located through the display. Thus, the positional relationship between the recording subject and the user in the reproduction environment is assumed to be the relationship between the virtual position of the basketball and an actual position of the user.

The audio signal of a speaker serving as the reproducing device and the output signal of a tactile-signal presenting device are corrected on the basis of the information on the first positional relationship in the recording environment and the information on the second positional relationship in the reproduction environment. This allows the user to perceive sensory stimulation according to the viewing position. Specifically, the closer to the display part, the higher the level of sounds and vibrations perceivable by the user.

In the information processing device according to the present technique, if the reproducing devices include multiple kinds of reproducing devices for multiple kinds of sensory stimulation information, the information on the second positional relationship may be information on the relationship between a virtual position of the recording subject, which is perceived by the user through the display part showing a reproduced image, and the position of the user.

In other words, the output signals of auditory information and tactile information are corrected according to visual information received by the user.

In the information processing device according to the present technique, the correction unit may make the correction according to a change of the first positional relationship in the recording environment.

Thus, the output signal is corrected in response to a movement of the recording device or a movement of the recording subject in the recording environment.

In the information processing device according to the present technique, the first positional relationship may be changed according to a change of the position of the recording subject in the recording environment.

Thus, the output signal of the reproducing device is corrected according to a change of the position of the recording subject.

In the information processing device according to the present technique, the first positional relationship may be changed according to a change of the position of the recording device in the recording environment.

Thus, the output signal of the reproducing device is corrected according to a change of the position of the recording device.

In the information processing device according to the present technique, the correction unit may make the correction according to a change of the second positional relationship in the reproduction environment.

Thus, the output signal is corrected in response to a movement of the reproducing device or a movement of the user in the reproduction environment.

In the information processing device according to the present technique, the second positional relationship may be changed according to a change of the position of the user in the reproduction environment.

Thus, the output signal of the reproducing device is corrected according to a change of the viewing position of the user.

In the information processing device according to the present technique, the second positional relationship may be changed according to a change of the position of the reproducing device in the reproduction environment.

Thus, the output signal of the reproducing device is corrected according to a change of the reproducing device.

In the information processing device according to the present technique, the correction unit may correct the output timing of the output signal.

Hence, for example, in the case of a large distance between the reproducing device (a display part, e.g., a display or a screen), which receives an outputted video, and the user, the output signal of a speaker serving as the reproducing device can be outputted later.

In the information processing device according to the present technique, the correction unit may correct the signal strength of the output signal.

Hence, for example, in the case of a large distance between the reproducing device (a display part, e.g., a display or a screen), which receives an outputted video, and the user, the output signal of a speaker serving as the reproducing device can be reduced in signal strength.

In the information processing device according to the present technique, the correction unit may make the correction according to environment information in the recording environment.

Thus, the output signal is corrected such that the user actually feels the same sensory stimulation as in the recording environment.

In the image processing device according to the present technique, the environment information may be air temperature information.

Thus, even if a temperature of the environment where the user is actually present is different from a temperature of the recording environment, the output signal is corrected such that the user in the reproduction environment can perceive sensory stimulation to be perceived by the user in the recording environment.

In the image processing device according to the present technique, the environment information may be medium information.

Thus, even if the medium (e.g., water or air) of the reproduction environment is different from the medium of the recording environment, the output signal is corrected such that the user in the reproduction environment can perceive sensory stimulation to be perceived by the user in the recording environment.

In the information processing device according to the present technique, the correction unit may correct the output signal of the reproducing device that reproduces acoustic information as the sensory stimulation information.

Thus, the output signal is corrected for the acoustic information that tends to arrive at different times when the recording position and the reproduction position are different from each other.

In the information processing device according to the present technique, the correction unit may correct the output signal of the reproducing device that reproduces vibration information as the sensory stimulation information.

Thus, the output signal is corrected for the vibration information that tends to arrive at different times when the recording position and the reproduction position are different from each other.

An information processing method according to the present technique is an information processing method in which the information processing device is caused to perform: positional relationship information acquisition to acquire the information on the first positional relationship between the recording device and the recording subject, the recording device performing recording in the recording environment for recording the sensory stimulation information transmitted from the recording subject, and the information on the second positional relationship between the recording subject and the user in the reproduction environment of the recorded sensory stimulation information, and a correction to correct the output signals of the reproducing devices for the reproduction of the sensory stimulation information on the basis of the information on the first positional relationship and the information on the second positional relationship.

The information processing method can obtain the same operation and effects as the information processing device according to the present technique.

A program according to the present technique is a program that causes the information processing device to perform: a positional-relationship-information acquisition function of acquiring the information on the first positional relationship between the recording device and the recording subject, the recording device performing recording in the recording environment for recording the sensory stimulation information transmitted from the recording subject, and the information on the second positional relationship between the recording subject and the user in the reproduction environment of the recorded sensory stimulation information, and a correction function of correcting the output signals of the reproducing devices for the reproduction of the sensory stimulation information on the basis of the information on the first positional relationship and the information on the second positional relationship.

With the program according to the present technique, the information processing device according to the present technique is implemented.

In a recording/reproduction system including the recording device and a reproduction control device according to the present technique, the recording device includes a sensory-stimulation-information acquisition unit that acquires the sensory stimulation information transmitted from the recording subject and a detection unit that detects information on the first positional relationship between the recording device and the recording subject, and the reproduction control device includes a positional-relationship-information acquisition unit that acquires the information on the first positional relationship and information on the second positional relationship between the recording subject and the user in the reproduction environment of the acquired sensory stimulation information, and a correction unit that corrects the output signal of the reproducing device for the reproduction of the sensory stimulation information on the basis of the information on the first positional relationship and the information on the second positional relationship.

With the recording/reproduction system according to the present technique, the audio signal of a speaker serving as the reproducing device and the output signal of a tactile-signal presenting device are corrected on the basis of the information on the first positional relationship in the recording environment and the information on the second positional relationship in the reproduction environment. This allows the user to perceive sensory stimulation according to the viewing position.

BRIEF DESCRIPTION OF DRAWINGS

FIG. 5 indicates the properties of acoustic information and vibration information according to the present embodiment.

DESCRIPTION OF EMBODIMENTS

Figure 1:
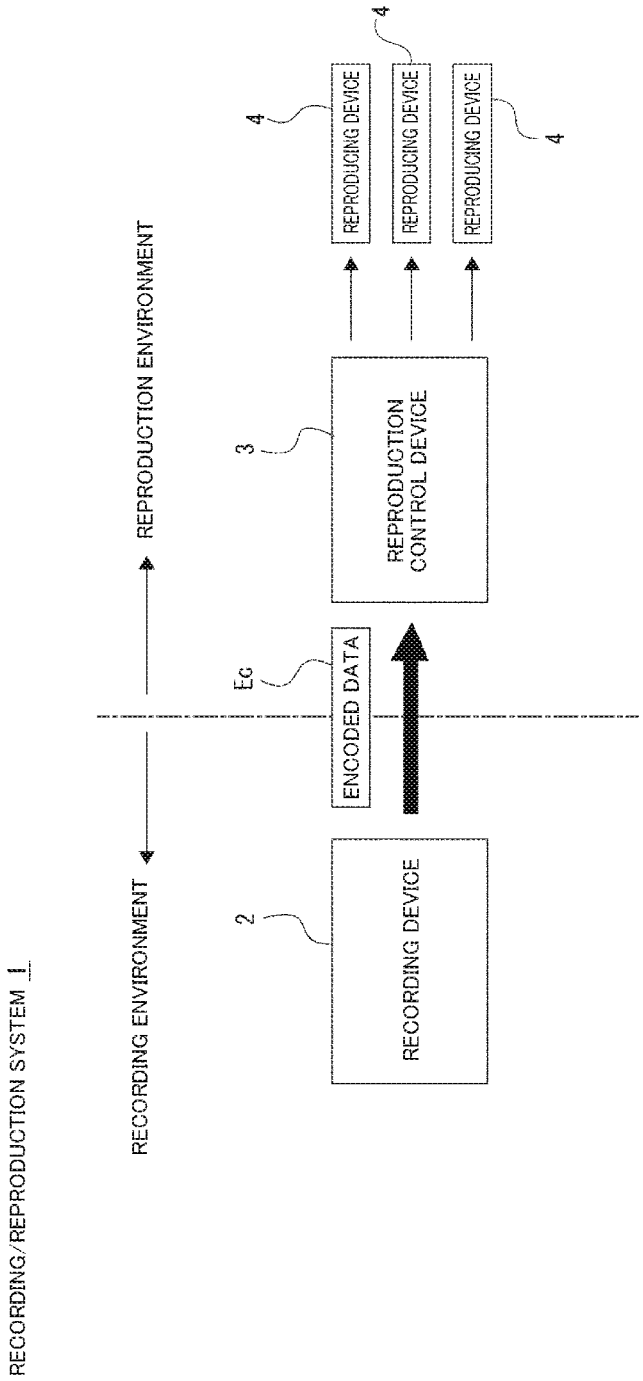
FIG. 1 illustrates a configuration example of a recording/reproduction system according to an embodiment of the present technique.

Hereinafter, an embodiment according to the present technique will be described in the following order.
<1. Configuration example of recording/reproduction system>
<2. Difference in transmission among sensory stimulation information>
<3. Configuration example of recording device>
<4. Configuration example of reproduction control device>
<5. Correction of sensory stimulation information>
<6. Summary>
<7. Present technique>

As configurations illustrated in the drawings referred to in the description, only main configurations are extracted according to the present technique. The configurations illustrated in the drawings can be changed in various ways according to the design without departing from the technical spirit of the present technique.

Hereinafter, the previously described configurations may be referred to with the same reference numerals and the description thereof may be omitted.

Furthermore, the present technique is not limited to the present embodiment and includes modifications and changes as long as the object of the present technique can be attained.
<1. Configuration Example of Recording/Reproduction System>

Referring to FIG. 1, a configuration example of a recording/reproduction system 1 will be described below. The recording/reproduction system 1 includes a recording device 2, a reproduction control device 3, and reproducing devices 4.

An environment for implementing the recording/reproduction system 1 is divided into a recording environment and a reproduction environment.

The recording device 2 records sensory stimulation information transmitted from a recording subject in the recording environment.

The recording subject is assumed to be, for example, an object or a person that serves as a vibration source or a sound source in the recording environment.

The recording device 2 includes, for example, an imaging device for imaging, a microphone for collecting acoustic information, and an IMU (Inertial Measurement Unit) for collecting vibration information.

The sensory stimulation information is various kinds of stimulation information about, for example, videos, sounds, sensory stimuli, and odors that are perceivable by a user.

The recording device 2 generate encoded data Ec by encoding collected sensory stimulation information.

The reproduction control device 3 performs reproduction control for allowing the user to perceive various kinds of sensory stimulation information recorded in the recording environment. For the reproduction control, the reproduction control device 3 acquires the encoded data Ec that has been encoded in the recording environment.

The reproduction control device 3 may acquire the encoded data Ec by optionally provided recording media such as a magnetic disk, an optical disk, a magneto-optical disk, or a semiconductor memory.

The reproduction control device 3 outputs sensory stimulation information, which is obtained by decoding the acquired encoded data Ec, to the reproducing devices 4.

The sensory stimulation information is reproduced by each of the reproducing devices 4, allowing the user in the reproduction environment to perceive the sensory stimulation information recorded in the recording environment.

Figure 2:
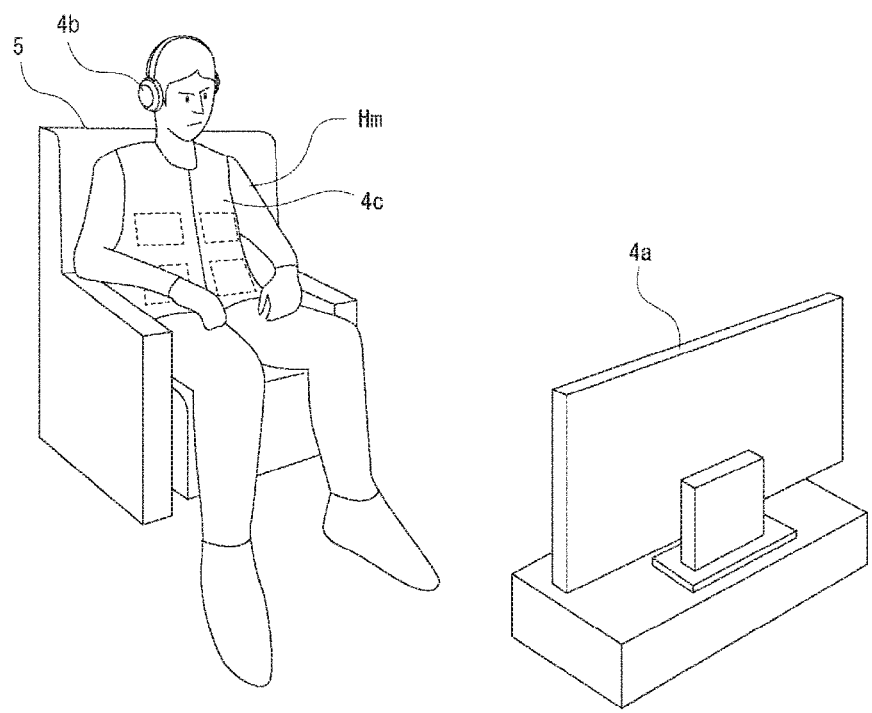
FIG. 2 illustrates a first example of a reproduction environment according to the present embodiment.

Referring to FIG. 2, a configuration example of the reproducing device 4 will be described below.

FIG. 2 illustrates an example in which a user Hm on a chair 5 in the reproduction environment perceives the sensory stimulation information outputted from the reproducing device 4.

The reproducing device 4 is provided as multiple kinds of devices according to multiple kinds of sensory stimulation information. For example, a video reproducing device 4a, a sound reproducing device 4b, and a vibration reproducing device 4c are provided as the reproducing devices 4.

The video reproducing device 4a is a device for outputting video that stimulates the vision of the user Hm. For example, the video reproducing device 4a is a TV (television) device having a display part as illustrated in FIG. 2. The video reproducing device 4a may be applied to other examples as a projector and a screen in a movie theater or the like and a head mounted display (HMD) on the user Hm.

The sound reproducing device 4b is a device for outputting sound that stimulates the hearing sense of the user Hm. For example, the sound reproducing device 4b is provided as headphones or earphones as illustrated in FIG. 2. The sound reproducing device 4b may be applied to other examples as a device wearable by the user Hm and speakers in a movie theater or a room.

The vibration reproducing device 4c is a device for outputting vibrations that stimulate the tactile sense of the user Hm. For example, the vibration reproducing device 4c is provided as a vibration vest having a vibrator or an actuator as illustrated in FIG. 2.

The vibration reproducing device 4c may be applied to other devices having vibration devices. For example, the vibration reproducing device 4c may be applied to smart devices such as a smart phone, a controller used for a game or an attraction, or a chair for the user Hm. Moreover, the vibration reproducing device 4c may be applied to the walls and ceiling of an attraction ride and a floor including a vibration device.

The configuration illustrated in FIG. 2 is merely exemplary, and the configuration example of the reproducing device 4 is not limited to this configuration.

Figure 3:
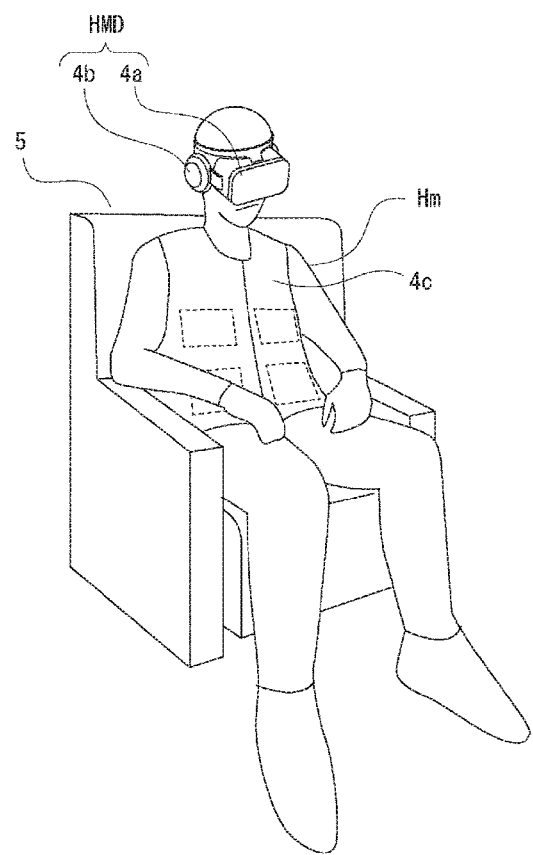
FIG. 3 illustrates a second example of the reproduction environment according to the present embodiment.

The video reproducing device 4a, the sound reproducing device 4b, and the vibration reproducing device 4c were described as the reproducing devices 4. For example, some or all of the reproducing devices 4 may be integrated. A chair 5 for the user Hm may act as, for example, the sound reproducing device 4b and the vibration reproducing device 4c that have a sound reproducing unit and a vibration reproducing unit. Alternatively, as illustrated in FIG. 3, a head mounted display HMD may act as the video reproducing device 4a and the sound reproducing device 4b.

In other cases, the reproducing devices 4 of the same type may be provided. For example, as the vibration reproducing devices 4c, a vibration vest on the upper body of the user Hm and a vibration supporter on a knee of the user Hm may be provided.

With this configuration, the recording/reproduction system 1 according to the present embodiment is implemented.

<2. Difference in Transmission Among Sensory Stimulation Information>

Figure 4:
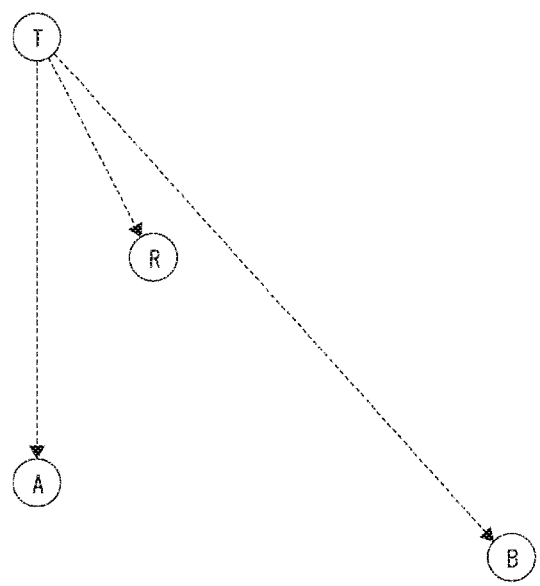
FIG. 4 illustrates positional relationships in a recording environment and the reproduction environment according to the present embodiment.

Referring to FIGS. 4 and 5, problems to be solved by the present embodiment will be described below. FIG. 4 schematically illustrates the positional relationship between a recording subject and the recording device 2 in the recording environment and the positional relationship between the recording subject and the user Hm in the reproduction environment.

In FIG. 4, a subject position T indicates the position of the recording subject, a recording position R indicates the position of the recording device 2 in the recording environment, a perception position A indicates the position of the user Hm in the reproduction environment, and a perception position B indicates the position of another user Hm. The perception position A and the perception position B as the positions of the user Hm are assumed to be the reproduction positions of the sound reproducing device 4b and the vibration reproducing device 4c.

The subject position T in the reproduction environment is a position supposed to have an object to be recognized by the user Hm having received the sensory stimulation information. For example, the subject position T is a virtual position of a recording subject to be recognized by the user Hm through the display part of the video reproducing device 4a that reproduces video (image).

Specifically, to the user Hm who watches a display (the display part of the video reproducing device 4a) showing a video of, for example, a basketball as a recording subject, the subject position T is the position of the basketball virtually located through the display. Thus, the positional relationship between the recording subject and the user Hm in the reproduction environment is assumed to be the relationship between the virtual position of the basketball and an actual position (watching position) of the user Hm.

In the present embodiment, it is assumed as an example that the user Hm wearing headphones (sound reproducing device 4b) and a vibration vest (vibration reproducing device 4c) watches video displayed on the display (video reproducing device 4a) as illustrated in FIG. 2.

To allow the user Hm at the perception position A to perceive, without losing realism, the sensory stimulation information recorded by the recording device 2, the subject position T viewed from the recording position R in the recording environment is preferably located at the subject position T (that is, the virtual position of the recording subject) viewed from the perception position A in the reproduction environment.

However, in most cases, the positional relationship between the subject position T and the recording position R in the recording environment and the positional relationship between the subject position T and the perception position A in the reproduction environment are actually different from each other.

Specifically, in the example of FIG. 4, the perception position A and the perception position B in the reproduction environment are located more remotely from the subject position T than the recording position R in the recording environment. The perception position B is located more remotely from the subject position T than the perception position A.

In this case, Table 1 of FIG. 4 indicates the arrival times of the sensory stimulation information to the positions from the subject position T. In Table 1, Time T0 indicates a time when the sensory stimulation information is transmitted from the subject position T. A time passes in the rightward direction along the horizontal axis.

Moreover, in Table 1 of FIG. 4, "Tr" indicates a time when the sensory stimulation information from the subject position T reaches the recording position R, "Ta" indicates a time when the sensory stimulation information reaches the perception position A, and "Tb" indicates a time when the sensory stimulation information reaches the perception position B.

According to Table 1, video information of the sensory stimulation information has a transmission rate based on a speed of light and thus is hardly affected by the positional relationship from the subject position T, and the times of transmission to the positions (recording position R, perception position A, perception position B) are substantially equal to one another.

In contrast, acoustic information and vibration information have considerably lower transmission rates than the video information and thus are susceptible to a distance from the subject position T as indicated in FIG. 4, and the times of transmission to the positions increase with a distance from the subject position T.

As indicated in FIG. 5, the acoustic information and the vibration information are considerably different from each other in transmission rate (Table 1), transmission distance for a certain time (Table 2), and arrival time at a predetermined distance (Table 3). Specifically, the vibration information has a higher transmission rate and a shorter arrival time at a predetermined distance than the acoustic information.

The difference is made by a difference between media used for transmission. In Tables 1 to 3 of FIG. 5, for example, air is used for transmitting the acoustic information (sound) while solids such as iron and wood are used for transmitting signal information.

Thus, if the sensory stimulation information recorded by the recording device 2 at a time corresponding to the positional relationship (direction and distance) between the subject position T and the recording position R is outputted as it is to the perception position A or the perception position B that has a different positional relationship with the subject position T, transmissions expected by the user Hm may deviate from the transmissions of the video information, the acoustic information, and the vibration information, so that the user Hm may feel uncomfortable.

Specifically, the acoustic information recorded in the recording environment is recorded after the video information because of a difference in transmission rate. The amount of delay is supposed to correspond to a distance between the recording subject and the recording position R.

In the reproduction environment, the amount of delay of the acoustic information desirably corresponds to the positional relationship between the virtual position (subject position T) of the recording subject perceived by the user Hm and the perception position A of the user Hm.

Thus, if a distance from the subject position T to the recording position R in the recording environment is different from a distance from the subject position T, which serves as a virtual position, to the perception position A in the reproduction environment, the acoustic information to be perceived at the recording position R is perceived by the user Hm at the perception position A by reproducing, without any corrections, the acoustic information recorded at the recording position R. This may cause the user Hm to feel uncomfortable.

For example, if a distance between the recording subject and the recording position R in the recording environment is larger (greater) than a distance between the position of the user Hm and the virtual position of the recording subject in the reproduction environment, the acoustic information reaches the user Hm earlier than expected, so that the realism is lost.

Thus, in the present embodiment, if the positional relationship between the subject position T and the recording position R in the recording environment and the positional relationship between the subject position T (the virtual position) and the perception position (the perception position A or the perception position B) in the reproduction environment are different from each other, the acoustic information outputted from the sound reproducing device 4b and the vibration information outputted from the vibration reproducing device 4c are corrected. The correction of the acoustic information and the vibration information can suppress a deviation of sounds and vibrations, which are perceived by the user Hm, from expectations, thereby preventing a loss of realism.

<3. Configuration Example of Recording Device>

Figure 6:
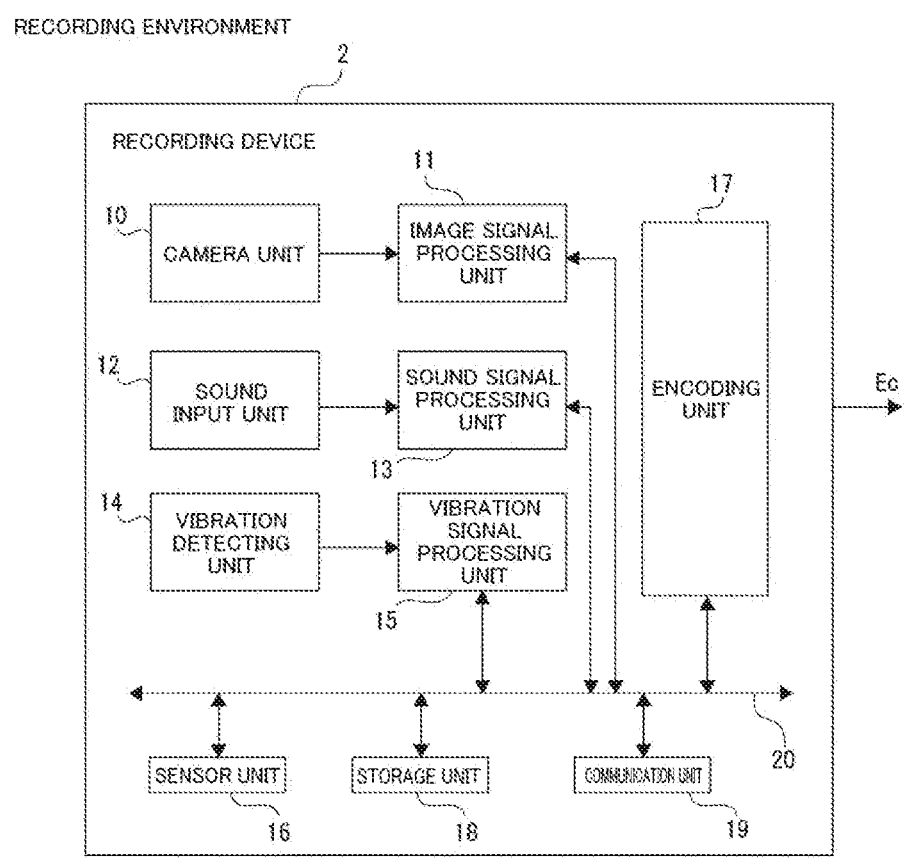
FIG. 6 illustrates a configuration example of a recording device according to the present embodiment.

Referring to FIG. 6, a configuration example of the recording device 2 according to the present embodiment will be described below.

The recording device 2 is configured with, for example, computer devices such as a CPU (Central Processing Unit) and a DSP (Digital Signal Processor). Various programs are executed by a CPU or a DSP and the like, so that the recording device 2 is provided with various functions.

The recording device 2 includes a camera unit 10, an image signal processing unit 11, a sound input unit 12, a sound signal processing unit 13, a vibration detecting unit 14, a vibration signal processing unit 15, a sensor unit 16, an encoding unit 17, a storage unit 18, and a communication unit 19. The image signal processing unit 11, the sound signal processing unit 13, the vibration signal processing unit 15, the sensor unit 16, the encoding unit 17, the storage unit 18, and the communication unit 19 are connected to one another via a bus 20 and exchange various kinds of data and a control signal or the like.

The camera unit 10 is provided with an imaging unit including an imaging device, which is configured with, for example, a CCD (Charged-coupled devices) image sensor or a CMOS (Complementary metal-oxide-semiconductor) image sensor, and an imaging optical system. The imaging unit receives light based on a subject (recording subject) imaged by a lens system and converts the light into an electric signal (captured image signal). The camera unit 10 supplies the converted captured image signal to the image signal processing unit 11.

The image signal processing unit 11 is configured as, for example, an image processor like a DSP (Digital Signal Processor) and obtains image data (captured image data) by performing various kinds of signal processing including A/D (Analog/Digital) conversion on the captured image signal from the camera unit 10. The captured image data obtained by the image signal processing unit 11 is supplied to the encoding unit 17.

The captured image data may be temporarily stored (recorded) in the storage unit 18.

The sound input unit 12 is configured with, for example, a microphone. The sound input unit 12 collects a sound from the recording subject and converts the sound into an electric signal (sound signal). The sound input unit 12 supplies the converted electric signal to the sound signal processing unit 13.

The sound signal processing unit 13 obtains sound data by performing various kinds of signal processing including amplification and A/D conversion on the sound signal. The sound data obtained by the sound signal processing unit 13 is supplied to the encoding unit 17.

The sound data may be temporarily stored in the storage unit 18.

The vibration detecting unit 14 is, for example, a vibration-detecting gyro sensor for an IMU or the like. The vibration detecting unit 14 detects vibrations from the recording subject serving as a source and converts the vibrations into an electric signal (vibration signal). The vibration detecting unit 14 supplies the converted electric signal to the vibration signal processing unit 15.

The vibration signal processing unit 15 obtains vibration data (tactile data) by performing various kinds of signal processing including amplification and A/D conversion on the vibration signal. The vibration data obtained by the vibration signal processing unit 15 is supplied to the encoding unit 17.

The vibration data may be temporarily stored in the storage unit 18.

The vibration data may be generated by filtering the sound data, or produced and edited vibration data may be recorded in advance in the storage unit 18.

The sensor unit 16 includes a position sensor for detecting the position of the recording device 2, a range sensor for detecting a distance from the recording device 2 to the recording subject, a temperature sensor for detecting a temperature of the recording environment, and various sensors for detecting the media of the recording environment, and the sensor unit 16 is configured to detect various kinds of information.

The camera unit 10 can also act as a range sensor. For example, the camera unit 10 includes two imaging units laterally separated from each other. The imaging units laterally separated from each other can generate a parallax between captured images so as to obtain distance information. Specifically, information on a distance to the recording subject can be obtained according to a stereo method on the basis of images captured by the imaging units. In other words, three-dimensional data can be obtained so as to indicate positions to the recording subject in the directions of the X axis, the Y axis, and the Z axis in a real space. Alternatively, the camera unit 10 including a TOF (Time-of-Flight) sensor or an image-surface phase difference sensor may act as a range sensor.

The encoding unit 17 encodes the sensory stimulation information, which is supplied from the image signal processing unit 11, the sound signal processing unit 13, and the vibration signal processing unit 15, according to a predetermined data format and stores the encoded data Ec, which is obtained by the encoding, in the storage unit 18.

In the storage unit 18, the encoded data Ec obtained by the encoding unit 17 is temporarily stored. Moreover, signal data from the signal processing units including the image signal processing unit 11, the sound signal processing unit 13, and the vibration signal processing unit 15 and various kinds of detection information from the sensor unit 16 may be temporarily stored in the storage unit 18.

The storage unit 18 may be a removable recording medium, e.g., a memory card, an optical disk, or magnetic tape, a fixed HDD (Hard Disk Drive), or a fixed semiconductor memory module.

The communication unit 19 communicates with an external device. Specifically, the communication unit 19 includes a module for radio communications, so-called 3G or 4G communications via a wireless LAN (Local Area Network) according to a mobile communication system for a cellular-phone system and the IEEE802.11 series, or wire communications via a wired LAN or a USB. Thus, various kinds of data can be exchanged with an external device, e.g., the reproduction control device 3.

With this configuration, the recording device 2 according to the present embodiment is implemented.

The present embodiment described an example where the camera unit 10, the sound input unit 12, and the vibration detecting unit 14 are all provided in the recording device 2. Some or all of the units may be provided in an external device capable of communicating with the recording device 2. In this case, in order to acquire position information on the units, a position sensor is provided for the external device. The external device supplies position information on the external device to the recording device 2 in addition to the acquired sensory stimulation information.

Each external device may be provided with various sensors or the like for acquiring environment information. In this case, the environment information is temperature information, humidity information, or medium information and serves as a factor responsible for a change of a transmission speed of the sensory stimulation information.

Alternatively, an external device including the camera unit 10, the sound input unit 12, and the vibration detecting unit 14 may be provided as another recording device 2. In this case, for each external device, the recorded sensory stimulation information is subjected to various kinds of signal processing including amplification and A/D conversion and is encoded, so that the encoded data Ec is generated.

<4. Configuration Example of Reproduction Control Device>

Figure 7:
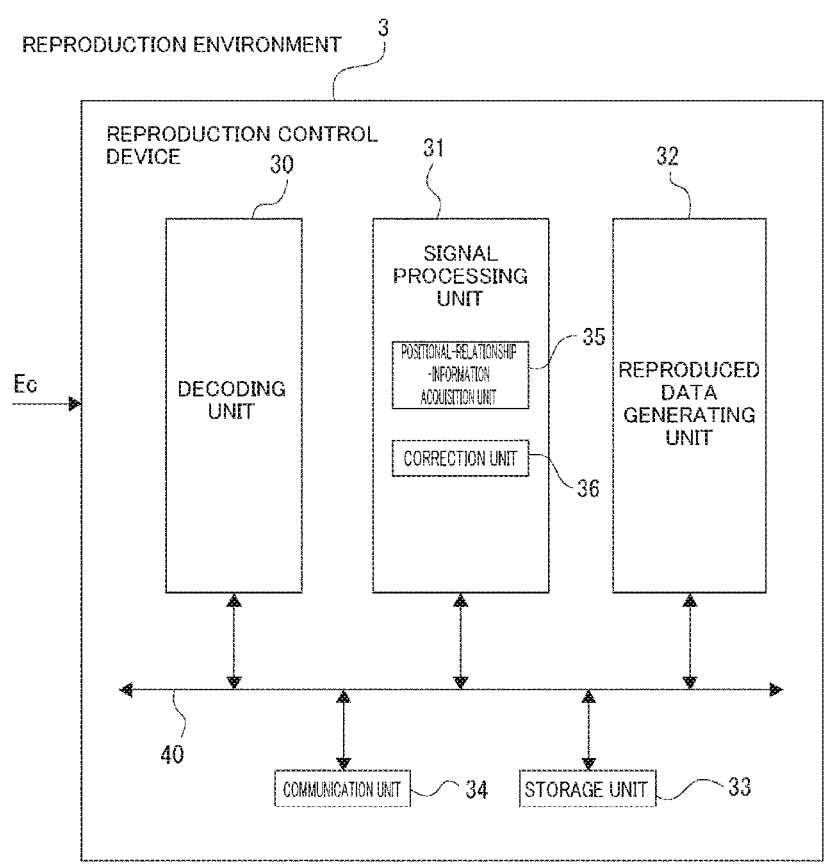
FIG. 7 illustrates a configuration example of a reproducing device according to the present embodiment.

Referring to FIG. 7, a configuration example of the reproduction control device 3 according to the present embodiment will be described below.

The reproduction control device 3 is configured with, for example, computer devices such as a CPU and a DSP. Various programs are executed by a CPU or a DSP and the like, so that the reproduction control device 3 is provided with various functions.

The reproduction control device 3 includes a decoding unit 30, a signal processing unit 31, a reproduced data generating unit 32, a storage unit 33, and a communication unit 34. The decoding unit 30, the signal processing unit 31, the reproduced data generating unit 32, the storage unit 33, and the communication unit 34 are connected to one another via a bus 40 and exchange various kinds of data and a control signal or the like.

The decoding unit 30 decodes the encoded data Ec, which has been encoded in the recording device 2, according to a predetermined data format. By decoding the encoded data Ec, the decoding unit 30 acquires image data, sound data, vibration data that have been obtained by recording the sensory stimulation information.

The signal processing unit 31 is configured with a microcomputer including a CPU, a ROM (Read Only Memory), and a RAM (Random Access Memory).

The signal processing unit 31 has the functions of a positional-relationship-information acquisition unit 35 and a correction unit 36.

The positional-relationship-information acquisition unit 35 acquires information on a first positional relationship that is a positional relationship between the recording device 2 and the recording subject in the recording environment and a second positional relationship that is a positional relationship between the recording subject (virtual position) and the user Hm in the reproduction environment of the recorded sensory stimulation information.

Figure 8:
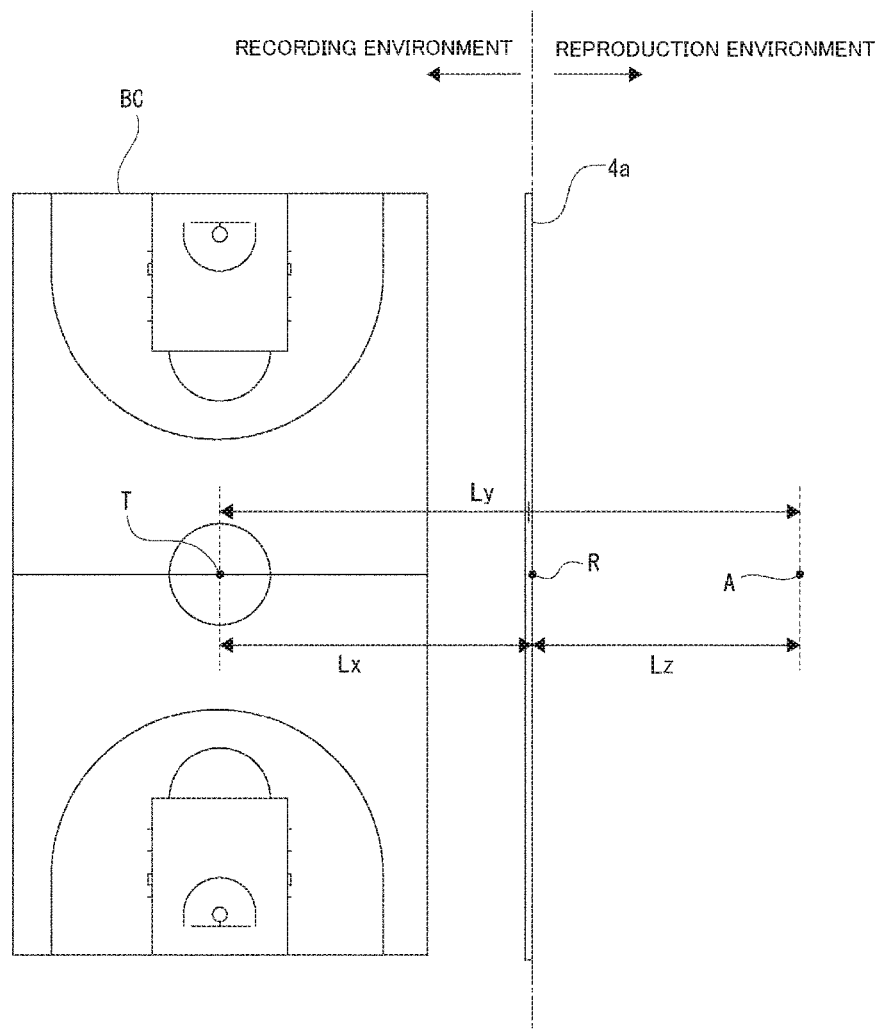
FIG. 8 illustrates positional relationships in the recording environment and the reproduction environment according to the present embodiment.

Referring to FIG. 8, the first positional relationship and the second positional relationship will be described below. FIG. 8 conceptually illustrates the positional relationship among the recording subject, the recording device 2, and the user Hm. As in FIG. 4, a subject position T indicates the position of the recording subject, a recording position R indicates the position of the recording device 2, and a perception position A indicates the position of the user Hm.

Moreover, in this example, the video reproducing device 4a includes a screen serving as a display part.

In the recording environment, the recording device 2 records sensory stimulation information transmitted from recording subjects such as a basket ball and a player in a basketball court BC. In the reproduction environment, the user Hm wearing the sound reproducing device 4b and the vibration reproducing device 4c as illustrated in FIG. 2 watches the output video of the video reproducing device 4a on a screen.

In this case, the first positional relationship is the positional relationship between the subject position T and the recording position R in the recording environment. For example, the first positional relationship can be expressed by a distance Lx between the subject position T and the recording position R.

The second positional relationship is the positional relationship between a virtual position (subject position T) of the recording subject perceived by the user Hm through the screen and the perception position A in the reproduction environment. For example, the second positional relationship can be expressed by a distance Ly between the virtual subject position T and the perception position A.

The distance Ly between the virtual position of the recording subject and the perception position A is the sum of the distance Lx between the subject position T and the recording position R and a distance Lz from the screen (the display part of the video reproducing device 4a) to the perception position A.

When the user Hm wears the reproducing device 4, the position of the attached reproducing device 4 is equivalent to the perception position A of the user Hm. Thus, the second positional relationship can be regarded as the positional relationship between the recording subject at the virtual position and the reproducing device 4 attached to the user Hm. In this case, the positional relationship includes various positional relationships such as one-dimensional to three-dimensional positional relationships.

The positional-relationship-information acquisition unit 35 in FIG. 7 acquires information on the positional relationship (first positional relationship) between the subject position T and the recording position R on the basis of the acquired position information on the recording device 2.

The positional-relationship-information acquisition unit 35 specifies the positional relationship between the perception position A and the recording position R by acquiring position information on the reproducing devices 4 of various types and acquires (calculates) information on the second positional relationship on the basis of the positional relationship between the perception position A and the recording position R and the positional relationship (first positional relationship) between the recording position R and the subject position T.

On the basis of the information on the first positional relationship and the information on the second positional relationship, the information being acquired by the positional-relationship-information acquisition unit 35, the correction unit 36 corrects an output signal to the reproducing device 4 that reproduces the sensory stimulation information. For example, by correcting the output timing of the output signal, the correction unit 36 adjusts a time before the sensory stimulation information reaches the user Hm (perception position A).

Furthermore, by correcting the signal strength of the output signal, the correction unit 36 adjusts the intensity of the sensory stimulation information perceived by the user Hm at the perception position A.

The correction unit 36 corrects the output signal of the reproducing device 4 according to a change of the first positional relationship and a change of the second positional relationship.

The first positional relationship changes according to, for example, a movement of the recording subject or a movement of the recording device 2 in the recording environment. The second positional relationship changes according to, for example, a movement of the user Hm or movements of the reproducing devices 4 of various types in the reproduction environment. The processing for correcting the output signal of the reproducing device 4 will be specifically described later. Hence, the various functions of the signal processing unit 31 according to the present embodiment are implemented.

The reproduced data generating unit 32 performs predetermined processing corresponding to the reproducing device 4 at the destination, for example, codec processing or packetization on the output signal corrected by the signal processing unit 31.

In the storage unit 33, the reproduced data that is generated by the reproduced data generating unit 32 is temporarily stored.

The storage unit 33 may be a removable recording medium, e.g., a memory card, an optical disk, or magnetic tape, a fixed HDD (Hard Disk Drive), or a fixed semiconductor memory module.

If the storage unit 33 is a removable recording medium, the recording medium in which the encoded data Ec is recorded can be connected to the reproduction control device 3 so as to supply the encoded data Ec to the decoding unit 30.

The communication unit 34 communicates with external devices like the communication unit 19 of FIG. 6. This allows the communication unit 34 to receive the encoded data Ec from the recording device 2.

Moreover, the communication unit 34 transmits the reproduced data, which is generated by the reproduced data generating unit 32, to the reproducing devices 4 of various types. The communication unit 34 may acquire position information or the like from the reproducing devices 4 of various types.

Hence, the reproduction control device 3 according to the present embodiment is implemented.

<5. Correction of Sensory Stimulation Information>

Figure 9:
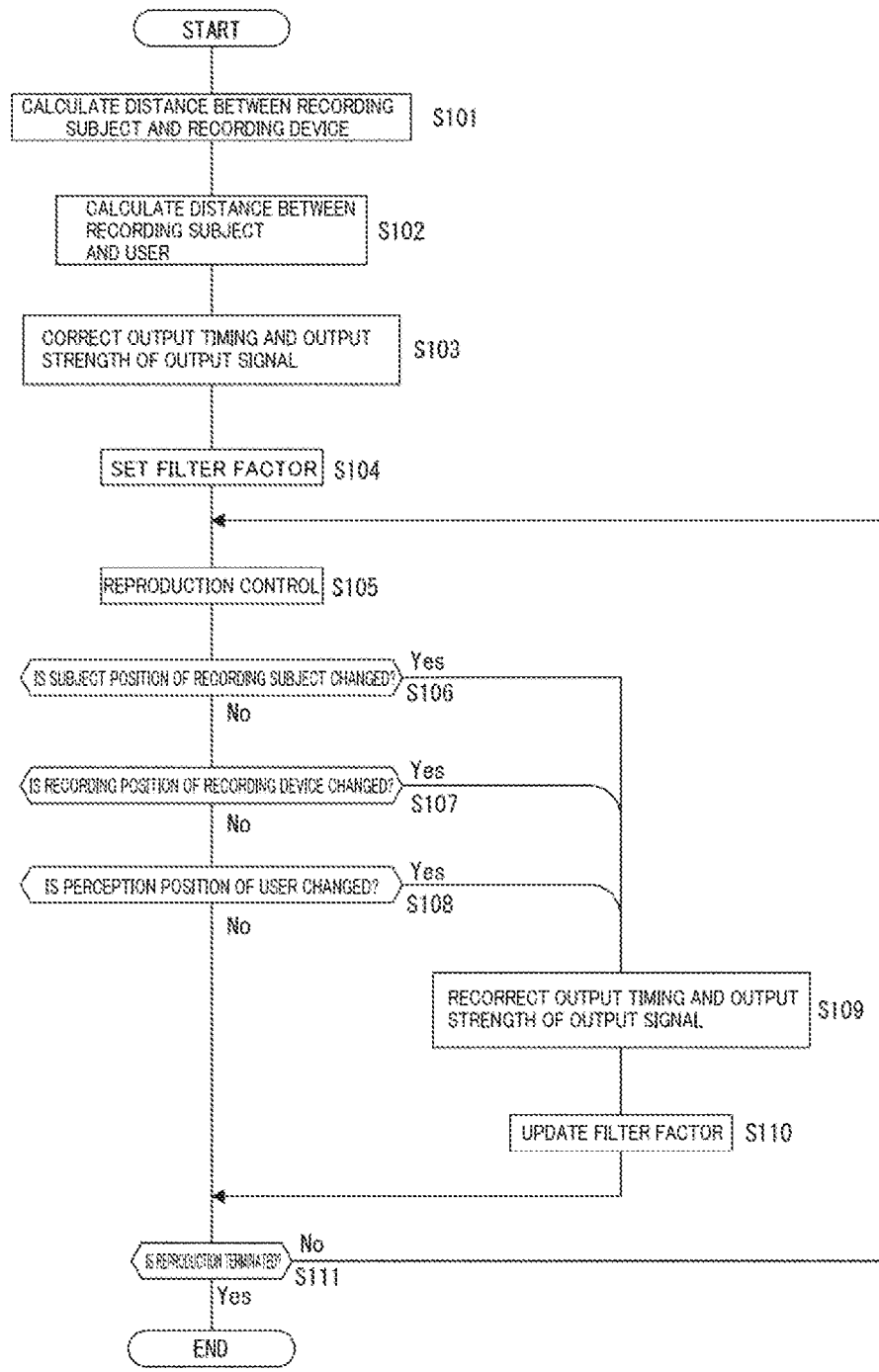
FIG. 9 is a flowchart of correction of sensory stimulation information according to the present embodiment.

Referring to FIG. 9, a correction of the sensory stimulation information by the signal processing unit 31 of the reproduction control device 3 will be described below. In the following example, the user Hm wearing the sound reproducing device 4b and the vibration reproducing device 4c as illustrated in FIG. 2 visually recognizes video displayed on the display part of the video reproducing device 4a.

In step S101, the signal processing unit 31 first calculates a distance between the recording subject and the recording device 2. For example, the signal processing unit 31 may acquire information on the subject position T and the recording position R to calculate the distance Lx or may acquire information on a distance from the recording device 2 to the subject position T as the distance Lx, the information being acquired by the recording device 2.

In step S102, the signal processing unit 31 then calculates the distance Ly between the recording subject and the user Hm. In this case, as illustrated in FIG. 8, the distance Ly can be calculated by summing the distance Lx and the distance Lz. Since the distance Lx is calculated by the processing of step S101, the signal processing unit 31 can determine the distance Ly by calculating the distance Lz.

The distance Lz can be calculated on the basis of the positional relationship between the user Hm and the recording position R. Since the user Hm wears the sound reproducing device 4b, the position of the user Hm can be detected by detecting the position of the sound reproducing device 4b. In the example of FIG. 2, the position of the vibration reproducing device 4c attached to the user Hm may be detected.

As illustrated in FIG. 8, the display part of the video reproducing device 4a can be regarded as the recording position R. Thus, the distance Lz between the recording position R and the user Hm can be regarded as a distance between the display part of the video reproducing device 4a and the sound reproducing device 4b.

Some methods can be used to calculate a distance between the display part of the video reproducing device 4a and the sound reproducing device 4b. For example, the video reproducing device 4a may be provided with a distance-measuring unit that calculates a distance from the sound reproducing device 4b (or the user Hm). Alternatively, a distance may be calculated from position information on the display part of the video reproducing device 4a and position information on the sound reproducing device 4b in the same coordinate system.

If seat positions are determined in advance as in a movie theater, a distance between the seat of the user Hm and a screen may be acquired from a database in which distance information on the seat positions and the screen is stored.

In this way, the signal processing unit 31 calculates (acquires) a distance between the subject position T (virtual position) and the perception position A. The distance Ly indicates the second positional relationship serving as a virtual positional relationship between the recording subject and the user Hm.

In step S103, the signal processing unit 31 corrects the output signal of the sensory stimulation information to the reproducing devices 4. The signal processing unit 31 corrects the output timing (delay amount) and the signal strength (attenuation) of the output signal on the basis of the first positional relationship and the second positional relationship.

For example, when a distance from the subject position T to the recording position R in FIG. 8 is denoted as "Lx[m]", a virtual distance from the subject position T to the perception position A is denoted as "Ly[m]", and a sound transmission rate is denoted as "Vaudio[m/s]", "Taudio[mS]" representing a correction amount for a delay amount of the output timing of acoustic information is calculated as expressed in, for example, [Formula 1] below.

$$T\text{audio} = (Ly \cdot Lx)/V\text{audio} \quad \text{[Formula 1]}$$

The calculated value of Taudio indicates a time for propagating sound from the recording position R to the perception position A.

When a vibration transmission rate is denoted as "Vhaptics[m/s]", "Thaptics[mS]" representing a correction amount for a delay amount of vibration-information output timing to be corrected is calculated as expressed in, for example, [Formula 2] below.

$$T\text{haptics} = (Ly \cdot Lx)/V\text{haptics} \quad \text{[Formula 2]}$$

The calculated value of Thaptics indicates a time for propagating sound from the recording position R to the perception position A.

A correction amount "Gaudio[dB]" for an attenuation of the acoustic information is calculated as expressed in [Formula 3]. "10" represents the base of a logarithm and (Ly/Lx) represents the antilogarithm of a logarithm in [Formula 3].

$$G\text{audio} = 20 \log(10, (Ly/Lx)) \quad \text{[Formula 3]}$$

The calculated value of Gaudio indicates an attenuation while a sound propagates from the recording position R to the perception position A.

A correction amount "Ghaptics[dB]" for an attenuation of the vibration information is calculated as expressed in [Formula 4]. "10" represents the base of a logarithm and (Ly/Lx) represents the antilogarithm of a logarithm in [Formula 4].

$$G\text{haptics} = 20 \log(10, (Ly/Lx)) \quad \text{[Formula 4]}$$

The calculated value of Ghaptics indicates an attenuation while a sound propagates from the recording position R to the perception position A.

The signal processing unit 31 calculates the correction amounts of the acoustic information and the vibration information on the basis of [Formula 1] to [Formula 4].

Also for the video information, a correction amount for the delay amount of the output timing and a correction amount for an attenuation may be calculated.

However, a delay amount and an attenuation of the video information are quite smaller than a transmission system delay and thus a correction amount for the delay amount of the output timing and a correction amount for an attenuation are not calculated for the video information.

In the correction of step S103, the signal processing unit 31 makes a correction according to the environment information in the recording environment.

Specifically, according to the environment information, the signal processing unit 31 corrects a delay amount of the output timing and an attenuation in the sensory stimulation information to be outputted to the reproducing devices 4.

For example, in the case of a correction based on an air temperature, the signal processing unit 31 acquires air temperature information on the recording environment from the recording device 2. The signal processing unit 31 calculates correction amounts for a delay amount of the output timing and an attenuation of the acoustic information and the vibration information on the basis of the acquired air temperature information.

In the correction of step S103, the signal processing unit 31 may make a correction on the basis of air temperature information on the reproduction environment. In this case, the signal processing unit 31 acquires air temperature information on the reproduction environment from the reproducing devices 4 provided with temperature sensors and calculates correction amounts for a delay amount of the output timing and an attenuation of the acoustic information and the vibration information on the basis of the acquired air temperature information.

Thus, even if a temperature of the reproduction environment where the user Hm is actually present is different from a temperature of the recording environment, the various kinds of sensory stimulation information are corrected to allow the user Hm in the reproduction environment to perceive sensory stimulation supposed to be perceived by the user Hm if the user Hm were in the recording environment.

In the correction of step S103, the signal processing unit 31 can make a correction in the recording environment according to a medium used for transmitting sensory stimulation. For example, the signal processing unit 31 acquires medium information on the recording environment from the recording device 2.

The medium information is information for specifying, for example, a medium that transmits the acoustic information and the vibration information. Specifically, the medium information is information on water, air, or floor materials.

The signal processing unit 31 calculates correction amounts for a delay amount of the output timing and an attenuation of the acoustic information and the vibration information on the basis of the medium information, which is acquired from the recording device 2, during recording.

The signal processing unit 31 may make a correction on the basis of, for example, medium information on the reproduction environment from the reproducing devices 4. At this point, the signal processing unit 31 calculates correction amounts for a delay amount of the output timing and an attenuation of the acoustic information and the vibration information on the basis of the medium information, which is acquired from the reproducing devices 4, in the reproduction environment.

Thus, even if the medium (e.g., water or air) of the reproduction environment is different from the medium of the recording environment, the various kinds of sensory stimulation information are corrected to allow the user Hm in the reproduction environment to perceive sensory stimulation supposed to be perceived by the user Hm if the user Hm were in the recording environment.

In step S104, the signal processing unit 31 then sets a filter factor for correcting a delay amount of the output timing and an attenuation of the sensory stimulation information, on the basis of the correction amounts calculated in step S103. The signal processing unit 31 corrects the various kinds of sensory stimulation information on the basis of the filter factor.

Thus, an output signal is outputted to the reproduced data generating unit 32 after the delay amount and the attenuation are properly corrected on the basis of the filter factor.

In step S105, the reproduction control device 3 performs reproduction control based on the corrected sensory stimulation information.

In the reproduction control, for example, reproduced data generated for the video reproducing device 4a by the reproduced data generating unit 32 from the video information acquired from the encoded data Ec is transmitted to the video reproducing device 4a by the communication unit 34, enabling an output by the video reproducing device 4a on the basis of the video information.

Furthermore, reproduced data generated for the sound reproducing device 4b by the reproduced data generating unit 32 from the corrected acoustic information is transmitted to the sound reproducing device 4b by the communication unit 34, enabling an output by the sound reproducing device 4b on the basis of the corrected acoustic information.

Moreover, reproduced data generated for the vibration reproducing device 4c by the reproduced data generating unit 32 from the corrected vibration information is transmitted to the vibration reproducing device 4c by the communication unit 34, enabling an output by the vibration reproducing device 4c on the basis of the corrected vibration information.

If the first positional relationship or the second positional relationship is not changed, the signal processing unit 31 performs processing in the order from steps S106, S107, and S108. Thereafter, until the output of information relating to the various kinds of sensory stimulation information to the reproducing devices 4 is terminated, for example, at the completion of the showing of the contents in step S111, the corrected acoustic information and vibration information are used for reproduction on the basis of the filter factor set in step S104.

If the first positional relationship or the second positional relationship is changed, steps S109 and S110 are performed on the basis of determination in steps S106, S107, and S108 so as to update the filter factor.

Specifically, in step S106, the presence or absence of a change of the subject position T of the recording subject is confirmed. If a change is confirmed, the signal processing unit 31 advances to step S109. In response to a change of the subject position T, the positional relationship (distance Lx) between the recording subject (subject position T) and the recording device 2 (recording position R) and the positional relationship (distance Ly) between the recording subject (subject position T) and the user Hm (perception position A) are changed. In other words, the first positional relationship and the second positional relationship are changed.

A change of the subject position T of the recording subject may be, for example, a movement of the recording subject during recording in the recording environment, a change from a video of the recording subject at a remote location to a video of the recording subject at a close location during reproduction by the video reproducing device 4a in the reproduction environment, or a change of video scenes (viewpoints of recording). Examples of a change of the subject position T of the recording subject may include a change of videos when the user Hm wearing the head mounted display HMD turns around.

In this case, in step S109, the signal processing unit 31 recalculates the distance Lx and the distance Ly as in step S103 and substitutes the calculated distance Lx and distance Ly into [Formula 4] from [Formula 1], thereby recalculating correction amounts for a delay amount of the input timing and an attenuation of the sensory stimulation information.

In step S110, the signal processing unit 31 updates (resets) the filter factor for correcting a delay amount of the output timing and an attenuation of the sensory stimulation information, on the basis of the correction amounts calculated in step S109. The signal processing unit 31 then corrects the various kinds of sensory stimulation information on the basis of the filter factor.

When the reproduction control is not completed, the signal processing unit 31 performs processing in the order from step S111 to step S105. In step S105, the signal processing unit 31 performs the reproduction control of the reproducing devices 4 on the basis of the sensory stimulation information that is corrected on the basis of the updated filter factor. Thereafter, the signal processing unit 31 performs the same processing.

If the subject position T of the recording subject is not changed in step S106, the signal processing unit 31 confirms the presence or absence of a change of the recording position R of the recording device 2 in step S107. If a change is confirmed, the signal processing unit 31 advances to step S109. This changes the positional relationship (distance Lx) between the recording subject (subject position T) and the recording device 2 (recording position R). In other words, the first positional relationship is changed.

A change of the recording position R may be, for example, a movement of the recording device 2 in the recording environment or a movement of the display part of the video reproducing device 4a that is assumed to be the recording position R in the reproduction environment.

In this case, in step S109, the signal processing unit 31 recalculates the distance Lx and the distance Ly as in step S103 and recalculates correction amounts for a delay amount of the input timing and an attenuation of the sensory stimulation information on the basis of [Formula 1] to [Formula 4].

In step S110, the signal processing unit 31 updates (resets) the filter factor for correcting a delay amount of the output timing and an attenuation of the sensory stimulation information, on the basis of the correction amounts calculated in step S109. The signal processing unit 31 then corrects the various kinds of sensory stimulation information on the basis of the filter factor.

When the reproduction control is not completed, the signal processing unit 31 performs processing in the order from step S111 to step S105. In step S105, the signal processing unit 31 performs the reproduction control of the reproducing devices 4 on the basis of the sensory stimulation information that is corrected on the basis of the updated filter factor.

Thereafter, the signal processing unit 31 performs the same processing.

If the recording position R of the recording device 2 is not changed in step S107, the signal processing unit 31 confirms the presence or absence of a change of the perception position A of the user Hm in step S108. If a change is confirmed, the signal processing unit 31 advances to step S109.

At this point, in response to a change of the perception position A, the positional relationship (distance Ly) between the recording subject (subject position T) and the user Hm (perception position) is changed. In other words, the second positional relationship is changed.

A change of the perception position A of the user Hm may be a movement of a vehicle carrying the user Hm or a movement of the user Hm.

The signal processing unit 31 can confirm a change of the perception position A of the user Hm when the position of the reproducing device 4 attached to the user Hm is changed. This is because the position of the reproducing device 4 can be regarded as the position of the user Hm. In other words, the positional relationship (distance Ly) between the recording subject and the user Hm is changed in response to a change of the position of the reproducing device 4 attached to the user Hm.

In this case, when the perception position A of the user Hm changes in step S108, the signal processing unit 31 recalculates the distance Lx and the distance Ly in step S109 as in step S103 and recalculates correction amounts for a delay amount of the input timing and an attenuation of the sensory stimulation information on the basis of [Formula 1] to [Formula 4].

In step S110, the signal processing unit 31 updates (resets) the filter factor for correcting a delay amount of the output timing and an attenuation of the sensory stimulation information, on the basis of the correction amounts calculated in step S109. The signal processing unit 31 then corrects the various kinds of sensory stimulation information on the basis of the filter factor.

When the reproduction control is not completed, the signal processing unit 31 performs processing in the order from step S111 to step S105. In step S105, the signal processing unit 31 performs the reproduction control of the reproducing devices 4 on the basis of the sensory stimulation information that is corrected on the basis of the updated filter factor.

Thereafter, the signal processing unit 31 performs the same processing.

During the execution of the processing, the signal processing unit 31 terminates the processing of FIG. 9 if reproduced data to be transmitted to the reproducing devices 4 is absent in step S111. The signal processing unit 31 may terminate the processing of FIG. 9 by detecting the end of reproduction by the reproducing devices 4.

In this way, the correction of the sensory stimulation information by the signal processing unit 31 according to the present embodiment is implemented.

In the present embodiment, after the completion of the setting of the filter factor in step S104, the signal processing unit 31 may recalculate correction amounts for a delay amount of the output timing and an attenuation of the sensory stimulation information according to a change of the air temperature information in the recording environment or the reproduction environment.

A change of the air temperature information in the recording environment may be a change of video scenes, for example, a change from a video in the water to a video on the water during reproduction by the video reproducing device 4a in the reproduction environment.

A change of the air temperature information in the reproduction environment may be, for example, a change of an air temperature in a movie theater or the like due to an increasing number of visitors or switching of air conditioning.

In this case, when detecting a change of the air temperature information in the recording environment or the reproduction environment, the signal processing unit 31 in step S109 recalculates correction amounts for a delay amount of the output timing and an attenuation of the sensory stimulation information according to the changed air temperature information.

In step S110, the signal processing unit 31 then updates (resets) the filter factor for correcting a delay amount of the output timing and an attenuation of the sensory stimulation information, on the basis of the correction amounts.

In the present embodiment, after the completion of the setting of the filter factor in step S104, the signal processing unit 31 may recalculate correction amounts for a delay amount of the output timing and an attenuation of the sensory stimulation information according to a change of the medium information in the recording environment or the reproduction environment.

A change of the medium information in the recording environment may be a change of video scenes, for example, a change from a video in the water to a video on the water during reproduction by the video reproducing device 4a in the reproduction environment.

A change of the medium information in the reproduction environment may be, for example, a dive of the attraction ride of the user Hm into the water.

In this case, when detecting a change of the medium information in the recording environment or the reproduction environment, the signal processing unit 31 in step S109 recalculates correction amounts for a delay amount of the output timing and an attenuation of the sensory stimulation information according to the changed medium information.

In step S110, the signal processing unit 31 then updates (resets) the filter factor for correcting a delay amount of the output timing and an attenuation of the sensory stimulation information, on the basis of the correction amounts.

The present embodiment described an example in which the signal processing unit 31 corrects the sensory stimulation information as in FIG. 9 for the video reproducing device 4a, the sound reproducing device 4b, and the vibration reproducing device 4c, which serve as the reproducing devices 4. The present embodiment is also applicable to an example of the processing performed for the video reproducing device 4a and the sound reproducing device 4b and an example of the processing performed for the video reproducing device 4a and the vibration reproducing device 4c. In other words, the sensory stimulation information can be corrected by the cooperation of two or more of the reproducing devices 4 according to the present embodiment.

<6. Summary>

The information processing device (the signal processing unit 31 in the reproduction control device 3) according to the present embodiment includes: the positional-relationship-information acquisition unit 35 that acquires information on the first positional relationship between the recording device 2 and the recording subject, the recording device 2 recording the sensory stimulation information in the recording environment for recording the sensory stimulation information transmitted from the recording subject, and information on the second positional relationship between the recording subject and the user Hm in the reproduction environment of the recorded sensory stimulation information; and the correction unit 36 that corrects the output signals of the reproducing devices 4 on the basis of the information on the first positional relationship and the information on the second positional relationship, the reproducing devices 4 reproducing the sensory stimulation information (see FIGS. 7 and 9).

The sound signal of the sound reproducing device 4*b* serving as the reproducing device 4 and the output signal of the vibration reproducing device 4*c* serving as the reproducing device 4 are corrected on the basis of the information on the first positional relationship in the recording environment and the information on the second positional relationship in the reproduction environment. This allows the user Hm to perceive sensory stimulation according to the viewing position.

Specifically, the closer to a screen or a display (the display part of the video reproducing device 4*a*), the higher the level of sounds and vibrations perceivable by the user Hm.

Thus, the user Hm can receive the sensory stimulation information with high realism as in the recording environment.

In the present embodiment, if the reproducing devices 4 include multiple kinds of reproducing devices 4 for multiple kinds of sensory stimulation information, the information on the second positional relationship is information on the relationship between a virtual position (subject position T) of the recording subject, which is perceived by the user Hm through the display part showing a reproduced image, and the position (perception position A) of the user Hm (see FIGS. 4 and 8).

In other words, the output signals of the acoustic information and the vibration information (tactile information) are corrected according to the video information received by the user Hm.

Thus, the user Hm can be provided with stimuli such as sounds and vibrations according to the direction and the distance of the recording subject (e.g., a basketball or a player in the recording of a basketball game) virtually and visually recognized by the user Hm through a screen or a display (the display part of the video reproducing device 4*a*), thereby providing the reproduction environment with realism without causing the user Hm to feel uncomfortable or annoyed.

In the signal processing unit 31 of the present embodiment, the correction unit 36 makes the correction according to a change of the first positional relationship in the recording environment (e.g., in S106 and S107 of FIG. 9).

Thus, the sensory stimulation information is corrected in response to a movement of the recording device 2 or a movement of the recording subject in the recording environment.

This can provide the sensory stimulation information with signal strength that does not cause the user Hm to feel uncomfortable. In other words, the user Hm is allowed to perceive various stimuli without feeling uncomfortable or annoyed.

In the present embodiment, a change of the first positional relationship corresponds to a change of the position of the recording subject in the recording environment (e.g., in S106 of FIG. 9).

Thus, the output signal of the reproducing device 4 is corrected according to a change of the position of the recording subject.

In other words, the user Hm is allowed to perceive a change of the position of the recording subject by changing the various kinds of sensory stimulation information. Thus, the user Hm is allowed to recognize a change of the position of the recording subject in multiple dimensions, thereby increasing realism.

In the present embodiment, a change of the first positional relationship corresponds to a change of the position of the recording device 2 in the recording environment (e.g., in S107 of FIG. 9).

Thus, the output signal of the reproducing device 4 is corrected according to a change of the position of the recording device 2.

In other words, the user Hm is allowed to perceive a change of the position of the recording device 2, that is, the viewpoint (or visual angle) of the user Hm by changing the various kinds of sensory stimulation information. Thus, the user Hm is allowed to recognize a change of the position of the recording device 2 in multiple dimensions, thereby increasing realism.

In the signal processing unit 31 of the present embodiment, the correction unit 36 makes the correction according to a change of the second positional relationship in the reproduction environment (e.g., in S108 of FIG. 9).

Thus, the output signal of the reproducing device 4 is corrected in response to a movement of the reproducing device 4 or a movement of the user Hm in the reproduction environment.

This can provide the sensory stimulation information with signal strength that does not cause the user Hm to feel uncomfortable. In other words, the user Hm is allowed to perceive various stimuli without feeling uncomfortable or annoyed.

In the present embodiment, a change of the second positional relationship corresponds to a change of the position of the user Hm in the reproduction environment (e.g., in S108 of FIG. 9).

Thus, the output signal of the reproducing device 4 is corrected according to a change of the perception position A of the user Hm.

In other words, the user Hm is allowed to perceive a change of the position of the user Hm by changing the various kinds of sensory stimulation information. For example, the sound level of reproduction increases when the user Hm approaches a screen or a display, whereas the sound level of reproduction decreases when the user Hm moves away from a screen or the like. Thus, the user Hm can be provided with the sensory stimulation information with high realism as in the recording environment.

In the signal processing unit 31 of the present embodiment, a change of the second positional relationship corresponds to a change of the position of the reproducing device 4 in the reproduction environment (e.g., in S108 of FIG. 9). Thus, the output signal of the reproducing device 4 is corrected according to a change of the reproducing device 4.

In other words, the user Hm is allowed to perceive a change of the position of the reproducing device 4 by changing the various kinds of sensory stimulation information. Thus, the user Hm is allowed to recognize a change of the position of the recording subject in multiple dimensions, thereby increasing realism.

In the signal processing unit 31 of the present embodiment, the correction unit 36 corrects the output timing of the output signal (e.g., in S103, S105, and S109 of FIG. 9).

Hence, for example, in the case of a large distance between the video reproducing device 4*a* (a display part, e.g., a screen), which receives an outputted video, and the user Hm, the output signal of the sound reproducing device 4*b* serving as the reproducing device 4 can be outputted later.

This can provide the sensory stimulation information for the user Hm at a proper time according to the positional relationship between the user Hm and a virtual recording subject, thereby increasing realism.

In the signal processing unit 31 of the present embodiment, the correction unit 36 corrects the signal strength of the output signal (e.g., in S103 and S109 of FIG. 9). Hence, for example, in the case of a large distance between the video reproducing device 4*a* (a display part, e.g., a screen), which receives an outputted video, and the user Hm, the output signal of the sound reproducing device 4*b* serving as the reproducing device 4 can be reduced in signal strength.

This can provide the user Hm with reproduced sound that is adjusted (corrected) at a proper sound level of reproduction according to the positional relationship between the user Hm and a virtual recording subject, thereby increasing realism.

In the signal processing unit 31 of the present embodiment, the correction unit 36 makes the correction according to the environment information in the recording environment (e.g., in S103 of FIG. 9).

Thus, the output signal to the reproducing device 4 is corrected such that the user Hm actually feels the same sensory stimulation as in the recording environment.

This can provide the sensory stimulation information for the user Hm as if in the recording environment, thereby increasing realism.

In the present embodiment, the environment information is air temperature information (e.g., in S103 of FIG. 9).

Thus, even if a temperature of the environment where the user Hm is actually present is different from a temperature of the recording environment, the output signal to the reproducing device 4 is corrected such that the user Hm in the reproduction environment can perceive sensory stimulation to be perceived by the user Hm if the user Hm were in the recording environment.

Thus, the user Hm can be provided with the reproduction environment with high realism as in the recording environment.

In the present embodiment, the environment information is medium information (e.g., in S103 of FIG. 9).

Thus, even if the medium (e.g., water or air) of the reproduction environment is different from the medium of the recording environment, the output signal to the reproducing device 4 is corrected such that the user Hm in the reproduction environment can perceive sensory stimulation to be perceived by the user Hm if the user Hm were in the recording environment.

This can provide the user Hm with the reproduction environment with high realism as in the recording environment.

In the signal processing unit 31 of the present embodiment, the correction unit 36 corrects the output signal of the reproducing device 4 that reproduces the acoustic information as the sensory stimulation information (e.g., in S103 and S109 of FIG. 9).

Thus, the output signal to the reproducing device 4 is corrected for the acoustic information that tends to arrive at different times when the recording position and the reproduction position are different from each other.

This can output the acoustic information from the reproducing device 4 without causing the user Hm to feel uncomfortable.

In the signal processing unit 31 of the present embodiment, the correction unit 36 corrects the output signal of the reproducing device 4 that reproduces the vibration information as the sensory stimulation information (e.g., in S103 and S109 of FIG. 9).

Thus, the output signal to the reproducing device 4 is corrected for the vibration information that tends to arrive at different times when the recording position and the reproduction position are different from each other.

This can output the acoustic information from the reproducing device 4 without causing the user Hm to feel uncomfortable.

The recording/reproduction system according to the present embodiment includes: the recording device 2 including a sensory-stimulation-information acquisition unit that acquires the sensory stimulation information transmitted from the recording subject, and a detection unit that detects information on the first positional relationship between the recording device 2 (recording position R) and the recording subject (subject position T); and the reproduction control device 3 including the positional-relationship-information acquisition unit 35 that acquires the information on the first positional relationship and information on the second positional relationship between the recording subject (subject position T) and the user Hm (perception position) in the reproduction environment of the recorded sensory stimulation information, and the correction unit 36 that corrects the output signals of the reproducing devices for the reproduction of the sensory stimulation information on the basis of the information on the first positional relationship and the information on the second positional relationship (e.g., FIGS. 1 and 9).

The recording/reproduction system configured as an embodiment can obtain the same operation and effects as in the foregoing embodiment.

An information processing method according to the present embodiment is an information processing method in which the information processing device is caused to perform: positional relationship information acquisition to acquire the information on the first positional relationship between the recording device 2 (recording position R) and the recording subject (subject position T), the recording device 2 performing recording in the recording environment for recording the sensory stimulation information transmitted from the recording subject, and the information on the second positional relationship between the recording subject (subject position T) and the user Hm (perception position) in the reproduction environment of the recorded sensory stimulation information, and a correction to correct the output signal of the reproducing device 4 for the reproduction of the sensory stimulation information on the basis of the information on the first positional relationship and the information on the second positional relationship. The information processing method as an embodiment can obtain the same operation and effects as the information processing device according to the foregoing embodiment.

The functions of the information processing device can be implemented as software processing by, for example, a CPU or a DSP. The software processing is executed based on a program.

A program according to the present embodiment is a program that causes the information processing device to perform: a positional-relationship-information acquisition function of acquiring the information on the first positional relationship between the recording device and the recording subject, the recording device performing recording in the recording environment for recording the sensory stimulation information transmitted from the recording subject, and the information on the second positional relationship between the recording subject and the user in the reproduction environment of the recorded sensory stimulation information, and a correction function of correcting the output signals of the reproducing devices for the reproduction of the sensory stimulation information on the basis of the information on the first positional relationship and the information on the second positional relationship.

With this program, the information processing device according to the foregoing embodiment can be implemented as the reproduction control device 3. In the present embodiment, the reproduction control device 3 performs the processing of FIG. 9 on the basis of the program, thereby implementing the present technique. The present technique can be also implemented by processing performed by the recording device 2 and the reproducing devices 4 according to the program recorded in the recording device 2 and the reproducing devices 4. Alternatively, the processing may be implemented by executing the program in an external server.

The program can be recorded in advance in a recording medium embedded in a device such as a computer device or a ROM or the like in a microcomputer including a CPU.

Alternatively, the program can be temporarily or permanently stored (recorded) on a removable recording medium such as a flexible disc, a CD-ROM (Compact Disc Read Only Memory), an MO (Magneto optical) disc, a DVD, a Blu-ray Disc (registered trademark), a magnetic disk, a semiconductor memory, or a memory card. The removable recording medium can be provided as so-called package software.

The program can be installed from the removable recording medium to a personal computer and can also be downloaded from a download site via a network such as the Internet or a local area network (LAN).

The program is suitable for widely providing the reproduction control device 3 according to the embodiment. For example, the program is downloaded to a personal computer, a portable information processing device, a mobile phone, a game console, or an AV (Audio Visual) device, causing the personal computer or the like to function as the reproduction control device 3.

<7. Present Technique>

The present technique can be also configured as follows:

(1)

An information processing device including: a positional-relationship-information acquisition unit that acquires information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information, and a correction unit that corrects the output signals of reproducing devices for the reproduction of the sensory stimulation information on the basis of the information on the first positional relationship and the information on the second positional relationship.

(2)

The information processing device according to (1), wherein if the reproducing devices include multiple kinds of reproducing devices for multiple kinds of sensory stimulation information, the information on the second positional relationship is information on the relationship between a virtual position of the recording subject, which is perceived by the user through the display part showing a reproduced image, and the position of the user.

(3)

The information processing device according to (1) or (2), wherein the correction unit makes the correction according to a change of the first positional relationship in the recording environment.

(4)

The information processing device according to (3), wherein the first positional relationship is changed according to a change of the position of the recording subject in the recording environment.

(5)

The information processing device according to (3) or (4), wherein the first positional relationship is changed according to a change of the position of the recording device in the recording environment.

(6)

The information processing device according to any one of (1) to (5), wherein the correction unit makes the correction according to a change of the second positional relationship in the reproduction environment.

(7)

The information processing device according to (6), wherein the second positional relationship is changed according to a change of the position of the user in the reproduction environment.

(8)

The information processing device according to (6) or (7), wherein the second positional relationship is changed according to a change of the position of the reproducing device in the reproduction environment.

(9)

The information processing device according to any one of (1) to (8), wherein the correction unit corrects the output timing of the output signal.

(10)

The information processing device according to any one of (1) to (9), wherein the correction unit corrects the signal strength of the output signal.

(11)

The information processing device according to any one of (1) to (10), wherein the correction unit makes the correction on the basis of a difference between environment information in the recording environment and environment information in the reproduction environment.

(12)

The information processing device according to (11), wherein the difference of the environment information is a difference in air temperature.

(13)

The information processing device according to (11), wherein the difference of the environment information is a difference in medium.

(14)

The information processing device according to any one of (1) to (13), wherein the correction unit corrects the output signal of the reproducing device that reproduces acoustic information as the sensory stimulation information.

(15)

The information processing device according to any one of (1) to (14), wherein the correction unit corrects the output signal of the reproducing device that reproduces vibration information as the sensory stimulation information.

(16)

An information processing method in which an information processing device is caused to perform: positional relationship information acquisition to acquire information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information, and a correction to correct the output signals of reproducing devices for the reproduction of the sensory stimulation information on the basis of the information on the first positional relationship and the information on the second positional relationship.

(17)
A program that causes an information processing device to perform: a positional-relationship-information acquisition function of acquiring information on a first positional relationship between a recording device and a recording subject, the recording device performing recording in a recording environment for recording sensory stimulation information transmitted from the recording subject, and information on a second positional relationship between the recording subject and a user in the reproduction environment of the recorded sensory stimulation information, and a correction function of correcting the output signals of the reproducing devices for the reproduction of the sensory stimulation information on the basis of the information on the first positional relationship and the information on the second positional relationship.

(18)
A recording/reproduction system including a recording device and a reproduction control device,
wherein the recording device includes:
a sensory-stimulation-information acquisition unit that acquires sensory stimulation information transmitted from a recording subject; and
a detection unit that detects information on a first positional relationship between the recording device and the recording subject, and
the reproduction control device includes:
a positional-relationship-information acquisition unit that acquires the information on the first positional relationship and information on a second positional relationship between the recording subject and a user in the reproduction environment of the recorded sensory stimulation information, and
a correction unit that corrects the output signals of reproducing devices for the reproduction of the sensory stimulation information on the basis of the information on the first positional relationship and the information on the second positional relationship.

Finally, the advantageous effects described in the present disclosure are exemplary and not limited, and may have other advantageous effects or may have some of the advantageous effects described in the present disclosure.

The embodiment described in the present disclosure is merely exemplary, and the present technique is not limited to the foregoing embodiment. Therefore, it goes without saying that various changes aside from the foregoing embodiment can be made according to the design and the like without departing from the technical spirit of the present technique. It should be noted that all the combinations of the configurations described in the embodiment are not always essential for solving the problem.

REFERENCE SIGNS LIST

1 Recording/reproduction system
2 Recording device
3 Reproduction control device
4 Reproducing device
4a Video reproducing device
4b Sound reproducing device
4c Vibration reproducing device
10 Camera unit
11 Image signal processing unit
12 Sound input unit
13 Sound signal processing unit
14 Vibration detecting unit
15 Vibration signal processing unit
16 Sensor unit
17 Encoding unit
30 Decoding unit
31 Signal processing unit
35 Positional-relationship information acquisition unit
36 Correction unit
T Subject position
R Recording position
A, B Perception position
Hm User

The invention claimed is:

1. An information processing device, comprising:
a positional-relationship-information acquisition unit configured to acquire information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information; and a correction unit configured to correct output signals of reproducing devices for reproduction of the sensory stimulation information based on the information on the first positional relationship and the information on the second positional relationship, wherein if the reproducing devices include multiple kinds of reproducing devices for multiple kinds of sensory stimulation information, the information on the second positional relationship is information on a relationship between a virtual position of the recording subject, which is perceived by the user through a display part showing a reproduced image, and a position of the user.

2. The information processing device according to claim 1, wherein the correction unit makes the correction according to a change of the first positional relationship in the recording environment.

3. The information processing device according to claim 2, wherein the first positional relationship is changed according to a change of a position of the recording subject in the recording environment.

4. The information processing device according to claim 2, wherein the first positional relationship is changed according to a change of a position of the recording device in the recording environment.

5. The information processing device according to claim 1, wherein the correction unit makes the correction according to a change of the second positional relationship in the reproduction environment.

6. The information processing device according to claim 5, wherein the second positional relationship is changed according to a change of a position of the user in the reproduction environment.

7. The information processing device according to claim 5, wherein the second positional relationship is changed according to a change of a position of each of the reproducing devices in the reproduction environment.

8. The information processing device according to claim 1, wherein the correction unit is further configured to correct an output timing of the output signals.

9. The information processing device according to claim 1, wherein the correction unit is further configured to correct signal strength of each of the output signals.

10. The information processing device according to claim 1, wherein the correction unit makes the correction according to environment information in the recording environment.

11. The information processing device according to claim 10, wherein the environment information is air temperature information.

12. The information processing device according to claim 10, wherein the environment information is medium information.

13. The information processing device according to claim 1, wherein the correction unit is further configured to correct the output signals of the reproducing devices that reproduce acoustic information as the sensory stimulation information.

14. The information processing device according to claim 1, wherein the correction unit is further configured to correct the output signals of the reproducing devices that reproduce vibration information as the sensory stimulation information.

15. An information processing method in an information processing device, the information processing method comprising:
acquiring information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information; and
correcting output signals of reproducing devices for reproduction of the sensory stimulation information based on of the information on the first positional relationship and the information on the second positional relationship, wherein if the reproducing devices include multiple kinds of reproducing devices for multiple kinds of sensory stimulation information, the information on the second positional relationship is information on a relationship between a virtual position of the recording subject, which is perceived by the user through a display part showing a reproduced image, and a position of the user.

16. A non-transitory computer readably medium comprising computer-executable instructions which when executed by a processor causes an information processing device to execute operations, the operations:
acquiring information on a first positional relationship between a recording device and a recording subject, the recording device performing recording in a recording environment for recording sensory stimulation information transmitted from the recording subject, and information on a second positional relationship between the recording subject and a user in a reproduction environment of the recorded sensory stimulation information; and
correcting output signals of reproducing devices for reproduction of the sensory stimulation information based on the information on the first positional relationship and the information on the second positional relationship, wherein if the reproducing devices include multiple kinds of reproducing devices for multiple kinds of sensory stimulation information, the information on the second positional relationship is information on a relationship between a virtual position of the recording subject, which is perceived by the user through a display part showing a reproduced image, and a position of the user.

17. A recording/reproduction system comprising a recording device and a reproduction control device, wherein the recording device includes:
a sensory-stimulation-information acquisition unit configured to acquire sensory stimulation information transmitted from a recording subject; and
a detection unit configured to detect information on a first positional relationship between the recording device and the recording subject, and the reproduction control device includes:
a positional-relationship-information acquisition unit configured to acquire the information on the first positional relationship and information on a second positional relationship between the recording subject and a user in a reproduction environment of the acquired sensory stimulation information; and
a correction unit configured to correct output signals of reproducing devices for reproduction of the sensory stimulation information based on the information on the first positional relationship and the information on the second positional relationship, wherein if the reproducing devices include multiple kinds of reproducing devices for multiple kinds of sensory stimulation information, the information on the second positional relationship is information on a relationship between a virtual position of the recording subject, which is perceived by the user through a display part showing a reproduced image, and a position of the user.

* * * * *